United States Patent [19]  
Pollard et al.

[11] Patent Number: 5,015,065  
[45] Date of Patent: May 14, 1991

[54] OPTICAL ANAMORPHOSER AND METHOD OF MANUFACTURE

[75] Inventors: Jean Pollard, Villebois-sur-Yvette; Robert Duchamp, Montpellier; Patrick Truchot, Champs-Sur-Marne, all of France

[73] Assignee: Societe d'Etudes et de Recherches de l'Ecole Nationale Superieure d'Arts et Metiers, Paris, France

[21] Appl. No.: 458,753
[22] PCT Filed: Jun. 14, 1988
[86] PCT No.: PCT/FR88/00307
 § 371 Date: Dec. 14, 1989
 § 102(e) Date: Dec. 14, 1989
[87] PCT Pub. No.: WO88/10439
 PCT Pub. Date: Dec. 29, 1988

[30] Foreign Application Priority Data

Jun. 18, 1987 [FR] France ............... 87 08513

[51] Int. Cl.⁵ .............................. G02B 6/04
[52] U.S. Cl. ..................... 350/96.24; 350/96.25; 350/320
[58] Field of Search ............. 350/96.25, 96.26, 96.27, 350/96.24, 420

[56] References Cited

U.S. PATENT DOCUMENTS

| 3,247,755 | 4/1966 | Siegmund ............ 350/96.27 |
| 3,525,561 | 10/1968 | Takahashi ............ 350/96.25 |
| 3,574,582 | 5/1970 | Siegmund et al. ...... 350/96.25 X |
| 4,026,693 | 5/1977 | Sato .................... 65/31 |
| 4,099,833 | 1/1978 | Tosswill .............. 350/96.25 |
| 4,101,188 | 7/1978 | Yevick ................ 350/96.25 |
| 4,112,170 | 9/1978 | Rauscher ............. 350/96.25 X |
| 4,121,206 | 10/1978 | Lemire ................ 340/380 |
| 4,427,717 | 1/1984 | Gauthier .............. 427/163 |
| 4,487,646 | 12/1984 | Murray et al. ........ 350/96.25 X |
| 4,548,631 | 10/1985 | Arditty et al. ........ 65/3.1 |

FOREIGN PATENT DOCUMENTS 2170079 9/1973 France .

Primary Examiner—John D. Lee  
Assistant Examiner—Stephen Barns  
Attorney, Agent, or Firm—Griffin Branigan & Butler

[57] ABSTRACT

The invention relates to an optical anamorphoser and to its method of manufacture in which a bundle of fibers (3) is deformed by twisting, is imprisoned in a body (5), and is sliced along two planes (2 and 3) perpendicular to its axis (4).

5 Claims, 3 Drawing Sheets

OPTICAL ANAMORPHOSER AND METHOD OF MANUFACTURE

There is a very large need on the present market for devices that transform an image either by magnifying it, or by shrinking it, or by digitizing it after splitting it into elements, or by reconstituting from electronic signals associated, for example, with elementary liquid crystals. Mention may be made, for example, of replacing bulky cathode ray tubes which are difficult to move and which consume quantities of energy by flat screen matrices which are smaller in size but still expensive. It is essential to magnify the image in this case since controlling electronic circuits which are large in size are prohibitive in cost.

Conventional optical magnifier devices using lenses are ill-suited for this magnification since they give rise to considerable distortion between the object and its magnified image. In addition, some flat screens are "passive", i.e. they use liquid crystals which need to be illuminated in order to be visible. Light must therefore be applied to the liquid crystals which then absorb the light when unexcited or allow it to pass (in a given range of wavelengths) when excited. In this application also, conventional optical systems are unsuitable.

Attempts have been made to use optical fibers for achieving such image magnification (or reduction) by processing the source (object image) by pixels. Such devices are to be found in certain types of high-definition camera. In these devices, a bundle of mutually touching optical fibers is deformed while hot so that the diameter of each fiber is reduced, thereby reducing the size of the image element applied to the larger diameter end and thus obtaining an image which is smaller in size.

The present invention seeks to provide a different device based on light guides and enabling such optical anamorphosis to be obtained, together with a method of manufacturing the device simply. The anamorphoser of the present invention, in addition to including other advantages, has the advantage of being modular and thus of being easily juxtaposed in order to build up large-sized screens without increasing the sizes of the electronic circuits, and thus retaining low cost prices.

To this end the present invention firstly provides an optical anamorphoser characterized in that it is constituted by a plurality of light guides of individually constant diameter, each defining one pixel, and extending in an embedding body between a first surface in which one end of each fiber defines a regular geometrical arrangement at a determined pitch and a second surface in which the other ends of the fibers define a geometrically similar arrangement to said first arrangement at a pitch which is scaled relative to the above-mentioned pitch.

Secondly, the present invention provides a method of manufacturing this optical anamorphoser, the method consisting in:

providing a bundle of fibers individually of the same diameter as the light guides, with the fibers being held in the bundle regularly spaced relative to one another in a geometrical arrangement which is geometrically similar to the above-mentioned arrangements at two fixing and guide plates extending perpendicularly to the fibers and spaced apart at a determined distance;

twisting the bundle about its axis by rotating the plates relative to each other through a determined angular amplitude;

maintaining this twist and fixing at least a portion of the bundle in this configuration by means of a resin in which said fibers are embedded; and after the resin has solidified, slicing the body obtained in this way perpendicularly to its longitudinal axis in two parallel planes whose positions relative to the body are determined in such a manner as to ensure that the slicing faces correspond to the above-mentioned surfaces.

It will be understood that during relative rotation of the plates, the outer fibers are not stressed in the same way as those situated close to the twisting axis. Thus, the bundle of fibers is held in at least one of the fixing plates in a manner which is not made final e.g. allows fiber slipage, until after the above-mentioned rotation has been performed, thereby allowing fibers under a certain amount of tension to slide relative to said plate.

In a particular implementation of the method of the invention, the bundle is built up from successive sheets, with each sheet adjoining the preceding sheet at the level of each fixing plate when said plates are at zero angular offset, and with each sheet being fixed to the plates after the plates have been angularly offset relative to each other.

Two variants of the method of the invention are mentioned, depending on the nature of the fibers used.

In the first variant, the said fibers are optical fibers which themselves constitute the light guides within the said body. In the second variant, the calibrated but non-optical fibers are removed from the body after the body has solidified, with the orifices left behind then being filled with a material having the required optical qualities. The slicing operation may be performed either before or after filling.

The invention will be better understood from the following description given purely by way of non-limiting example and serving to show up secondary characteristics and advantages.

Reference is made to the accompanying drawings, in which:

FIGS. 4 and 5 show a particular stage in the method of the invention.

Figure 1:
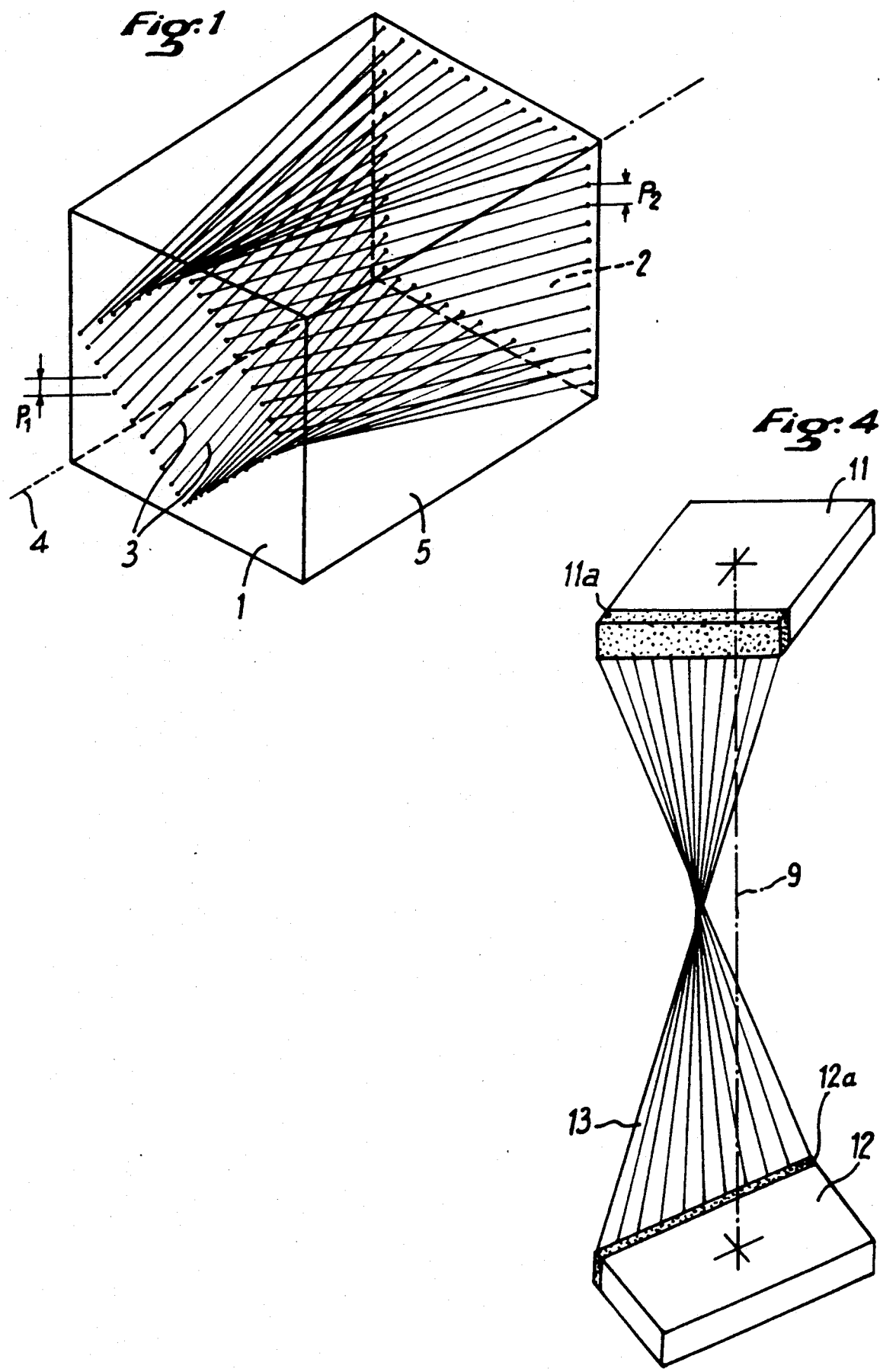
FIG. 1 is a perspective diagram of an anamorphoser in accordance with the invention.

With reference to FIG. 1, a device can be seen for transmitting an image (with reduction or magnification) between two planes 1 and 2 by means of light guides 3, e.g. optical fibers. This anamorphoser is such that the images formed and collected at respective ones of the planes are geometrically similar and rotated about the axis of symmetry 4 of the apparatus. In order to obtain these results, the light guides are initially disposed in a bundle running from a first face 1 where their ends are disposed regularly spaced apart from one another at a pitch $p_1$ at the intersections of a lattice which may be square, triangular, or more generally polygonal, to a second face 2 where their ends are disposed in the same configuration but at a pitch $p_2$. It should be observed that the figure shows only the outermost fibers in the bundle, and indeed it only shows some of them.

By way of example, an anamorphoser as shown in FIG. 1 could comprise 4,096 light guide ends each defining a pixel or sampling point for an image present in the plane 1, each pixel having a diameter of 76 micrometers and being disposed in a square matrix having a pitch along the sides of the squares of 100 micrometers. In the plane 2, the image naturally comprises the same number of points at the same diameter as in the plane 1, but they are now disposed in a square matrix having a pitch of 320 micrometers. The scaling ratio is thus 3.2.

The light guides 3 are enclosed in a body 5, e.g. made of resin as described below with reference to the method of manufacture, or they are constituted by channels made through the body and filled with a material having the required optical qualities.

Figure 2:
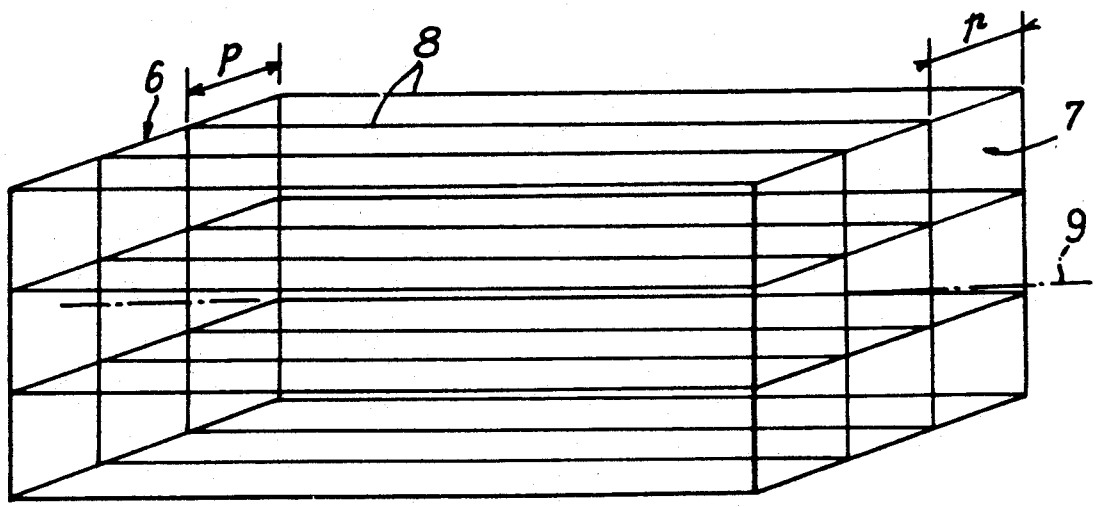
FIGS. 2 and 3 show the theory behind the method of manufacturing an anamorphoser as shown in FIG. 1.
Figure 3:
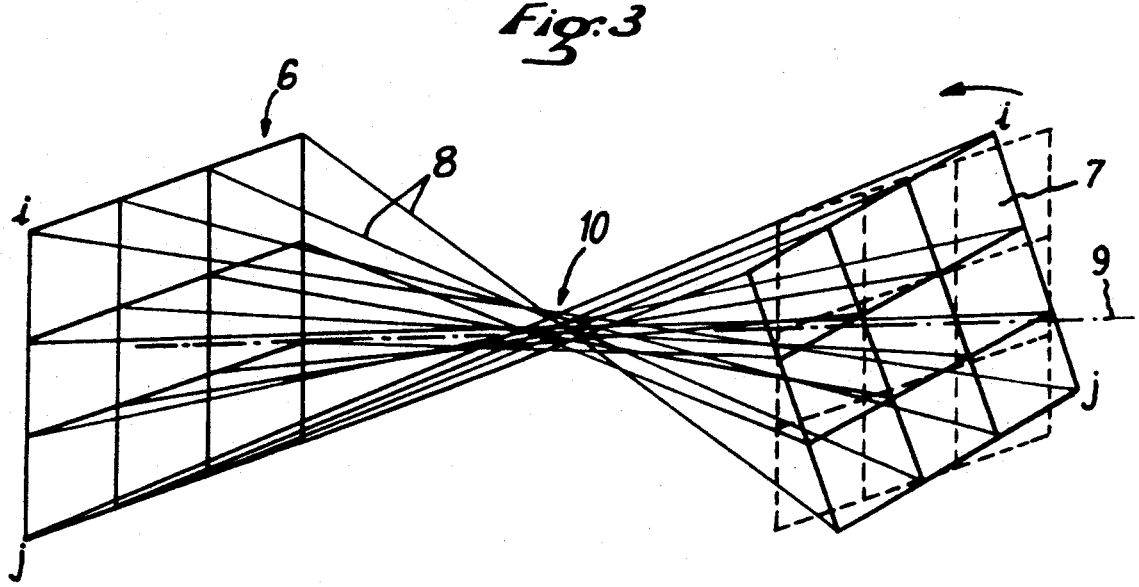

FIGS. 2 and 3 are diagrams showing a method of manufacturing such an anamorphoser. In FIG. 2, two mutually parallel plates 6 and 7 are shown diagrammatically, perpendicular to the axis 9 of a bundle of fibers 8 (the bundle containing only 16 fibers in this case). The fibers are fixed to the plates at the intersections of a square matrix having a certain pitch p. By rotating one of the plates 7 relative to the other plate 6, as shown in FIG. 3, and insofar as the fibers in the bundle are capable either of elongating sufficiently or else of sliding through one of the plates to take up the elongations to which they are subjected (other than at the center) during said rotation, it can be seen and it can be shown mathematically that each section of the bundle deformed in this way is geometrically similar with the sections where the fibers are implanted in each of the plates. Naturally, the amplitude of the rotation, the diameter of the fibers, and the distance between the plates define the maximum scaling ratio which can be obtained. It will be understood that the smallest section is obtained when the fibers in the middle of the bundle, in the zone 10, come into contact with one another.

The method of the invention is thus based on the principle of obtaining a configuration of fibers as shown in FIG. 3 and in fixing it by embedding the fibers, e.g. in a resin. Two anamorphosers can thus be obtained by slicing through on either side of the zone 10, thereby obtaining two truncated pyramids whose end faces are parallel and perpendicular to the axis 9 of the bundle.

Several different sorts of fiber may be used. The fibers may be monofilament optical fibers, thereby allowing light to be conveyed in both directions. They may also be multifilament fibers, with some specialized in conveying light in one direction and the others for conveying light in the other direction. Finally, the fibers may be non-optical fibers made of carbon, or a metal alloy, or a high strength synthetic material. In this case, the fibers are removed from the body and replaced by a material whose optical qualities are suitable for conducting light.

The bundle of fibers may be built up in several different ways. One of them is shown in FIG. 4. This diagram shows the fiber maintaining plates at 11 and 12. These plates are built up by juxtaposing individual supports such as 11a and 12a which hold together respective ends of a sheet 13. These individual supports may be constituted by grooved strips having an adhesive on one face. The fibers are received in the grooves and are held therein by adhesive which allows the fibers to slide a certain amount with respect thereto. The thickness of each support is designed as a function of the desired pitch of the lattice. The supports are thus juxtaposed in succession next to one another in order to build up the plates, with each sheet that is put into place being subjected to twisting about the axis 9 through an amplitude equal to that which is finally applied, thereby obtaining the necessary elongations of the fibers as made possible by the fibers sliding relative to the supports prior to final fixing of the fibers in the supports, in particular by applying pressure.

Figure 5:
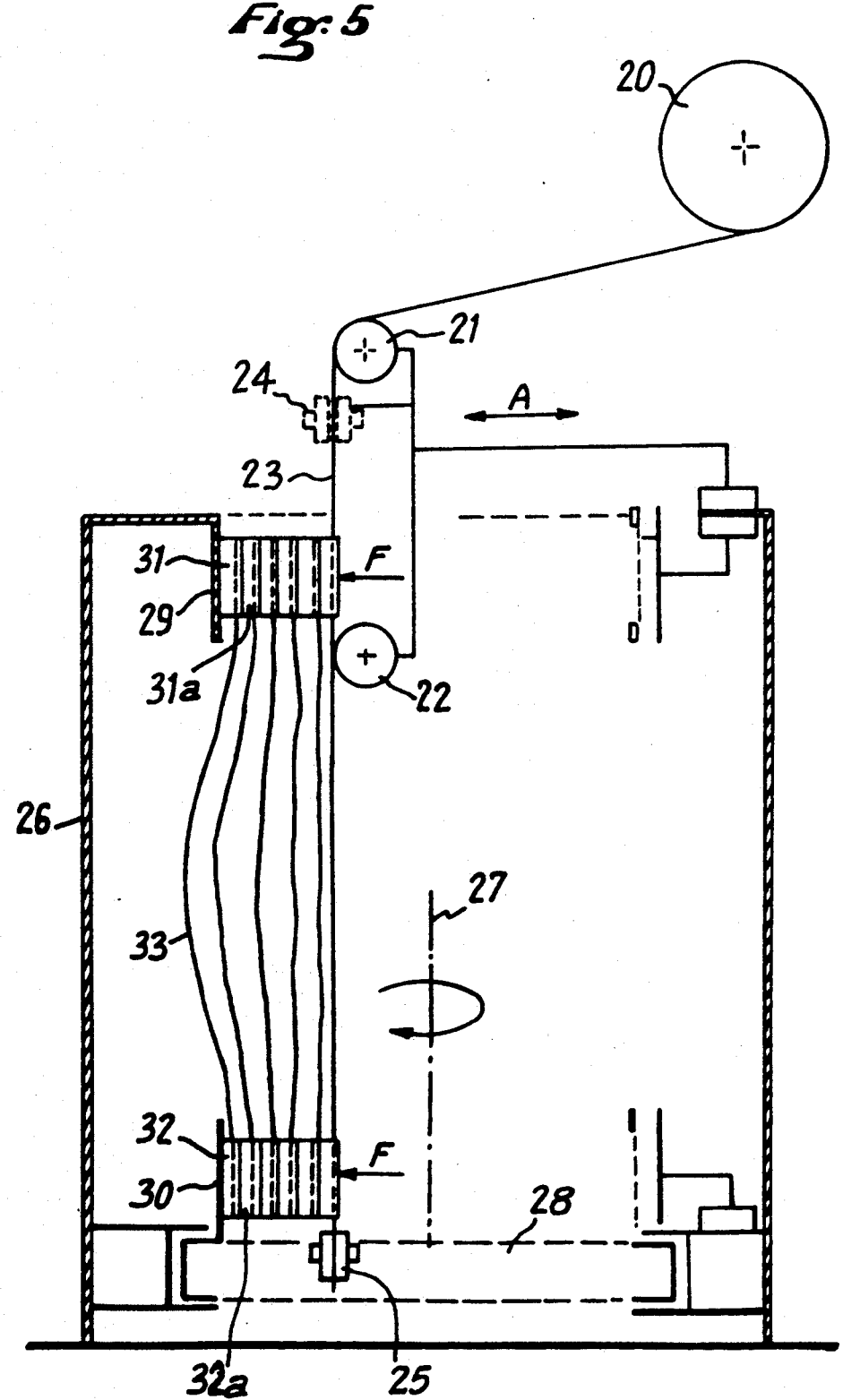

FIG. 5 is a diagram of apparatus for making an anamorphoser of the invention. In this diagram, 20 represents a set of fiber supply reels. Rolls 21 and 22 deflect and guide the fibers delivered from the reels 20 in order to build up a sheet 23. Grasping means 24 and 25 serve to pull the sheet and apply tension to it if required. The rolls 21 and 22, the grasping means 24 and 25, and the sheet 23 are mounted on carriages (not shown) enabling them to be displaced in direction A relative to a frame 26, transversely to the axis of rotation 27 of a bottom turntable 28.

The first sheet is drawn in the vicinity of two abutments 29 and 30, with the abutment 30 being carried by the turntable 28. Respective individual supports 31 and 32 are placed against these supports. The sheet is placed between these supports and other adjacent supports 31a and 31b which are pressed lightly against one another. The sheet is under slight tension between the clamps 24 and 25 and the turntable 28 is rotated through the desired amplitude of twisting. The top and bottom fixings of the sheet become final by applying high pressure along arrow F against the individual adhesive supports, and the turntable returns to its initial position. The sheet takes up the shape 33 in which the fibers are flat. The sheet is then cut and reformed between other adjacent elementary supports in order to be fixed thereto in like manner. The elongations become less and less marked as the sheets come closer to the axis 27 (at least with respect to the control fibers thereof). Thus, in order to make an anamorphoser having the characteristics of the above examples, 64 successive sheets are juxtaposed, 32 of them being on one side of the axis 27 and 32 on the other, with each sheet being pre-lengthened.

The anamorphoser is then completed by rotating the turntable 28 through the appropriate amplitude and then embedding the bundle as deformed in this way in resin. The mold used for performing this potting is not described in detail. Once the body has hardened, it is sliced along two planes perpendicular to its longitudinal axis with the planes being selected for obtaining the required scaling of pitch between two faces of the anamorphoser. It can be seen that the apparatus described enables two anamorphosers to be extracted from the deformed bundle of fibers.

If the fibers are not optical fibers, the fibers that have been used for the overmolding process are removed like cores from a mold and they are replaced with an optical material inserted in the channels left free in this way, with the material being inserted either while in the liquid state or else by threading through optical fibers of appropriate diameter.

The invention is advantageously applicable to optical apparatuses for displaying or making images.

We claim:

1. A method of manufacturing an optical anamorphoser having a plurality of light guides of individually constant diameter where each light guide defines one pixel and wherein the light guides extend in an embedding solid body between a first surface in which one ends of the light guides defines a regular first geometrical arrangement of pre-determined first pitch and a second surface in which the other ends of the light guides define a second geometrical arrangement similar to said first geometrical arrangement, but at a second pitch which is scaled relative to said first pitch, comprising:

(1) forming fibers having individually the same diameter as said light guides into a bundle of fibers where the fibers of the bundle are spaced apart from each other such that the spacing disposes the fibers in said first geometrical arrangement having a longitudinal axis of the bundle of fibers;

(2) fixing one ends of the fibers in a first plate and fixing the other ends of the fibers in a second plate, with said plates being disposed perpendicular to the longitudinal axis of the bundle of fibers and being spaced apart a pre-determined distance;

(3) rotating at least one of said plates relative to the other plate through a pre-determined angular amplitude so as to twist said bundle of fibers about its longitudinal axis;

(4) maintaining said twisted bundle of fibers and fixing at least a portion of the twisted bundle of fibers in that twisted configuration by embedding said twisted bundle of fibers in a hardenable resin;

(5) allowing the resin to harden into a solid body; and (6) slicing the solid body perpendicularly to the said longitudinal axis of the bundle of fibers so as to form at least two parallel planes, which plates are positioned relative to said longitudinal axis so as to form said first and second surfaces.

2. A method according to claim 1 characterized in that the bundle of fibers is held in at least one of the plates in a manner which is not made final until after said rotating has been performed, thereby allowing fibers under a certain amount of tension to slide relative to said at least one plate.

3. A method according to claim 2, characterized in that the bundle of fibers is built up from successive sheets of fibers with each sheet adjoining a preceding sheet at the level of each said plates when said plates are at a zero angular offset, and fixing each sheet to the plates after the places have been rotated relative to each other.

4. A method according to claim 1, characterized in that the said fibers are calibrated optical fibers and constitute the light guides.

5. A method according to claim 1, characterized in that the said fibers are calibrated strong fibers having the same diameter as the light guides, and said fibers are extracted from the said solid body and orifices formed thereby are filled with a material suitable for constituting the light guides.

* * * * *